US012627498B2

(12) United States Patent
Staufer et al.

(10) Patent No.: US 12,627,498 B2
(45) Date of Patent: May 12, 2026

(54) KEY AND IDENTIFIER FOR SESSION ESTABLISHMENT

(71) Applicant: Nokia Technologies Oy, Espoo (FI)

(72) Inventors: Markus Staufer, Munich (DE); Peter Schneider, Munich (DE); Ranganathan Mavureddi Dhanasekaran, Munich (DE); Saurabh Khare, Bangalore (IN)

(73) Assignee: NOKIA TECHNOLOGIES OY, Espoo (FI)

( * ) Notice: Subject to any disclaimer, the term of this patent is extended or adjusted under 35 U.S.C. 154(b) by 343 days.

(21) Appl. No.: 18/447,374

(22) Filed: Aug. 10, 2023

(65) Prior Publication Data

US 2024/0056301 A1 Feb. 15, 2024

(30) Foreign Application Priority Data

Aug. 12, 2022 (IN) .............................. 202241046180

(51) Int. Cl.
*H04L 9/32* (2006.01)

(52) U.S. Cl.
CPC ...................................... H04L 9/32 (2013.01)

(58) Field of Classification Search
CPC ......................................................... H04L 9/32

(Continued)

(56) References Cited

U.S. PATENT DOCUMENTS

2009/0024848 A1* 1/2009 Takasugi ............... H04L 9/3273
713/169
2022/0322067 A1* 10/2022 Kim .................. H04W 12/0433

FOREIGN PATENT DOCUMENTS

CA 3 204 543 A1 7/2022

OTHER PUBLICATIONS

"3rd Generation Partnership Project; Technical Specification Group Services and System Aspects; Authentication and Key Management for Applications (AKMA) based on 3GPP credentials in the 5G System (5GS) (Release 17)", 3GPP TS 33.535, V17.6.0, Jun. 2022, 25 pages.

(Continued)

*Primary Examiner* — Jeffrey C Pwu
*Assistant Examiner* — Samuel Ambaye
(74) *Attorney, Agent, or Firm* — SQUIRE PATTON BOGGS (US) LLP

(57) ABSTRACT

Method comprising:
  monitoring whether a network receives an authorization request for establishing a session of an AF with a UE, wherein the authorization request comprises a permanent identifier of the AF, a received temporary identifier of the AF, and a temporary identifier of a UE;
  if the authorization request is received:
    forming a key identifier based on the temporary identifier of the UE;
    retrieving, based on the key identifier, a stored key and a first permanent identifier of the UE;
    calculating a calculated temporary identifier of the AF based on the permanent identifier of the AF and the stored key;
    checking whether the calculated temporary identifier of the AF is identical with the received temporary identifier of the AF;
    inhibiting authorizing the AF for the establishing the session with the UE if the calculated temporary identifier of the AF is not identical with the received temporary identifier of the AF.

16 Claims, 10 Drawing Sheets

(58) Field of Classification Search
     USPC ........................................................ 713/168
     See application file for complete search history.

(56)                    References Cited

OTHER PUBLICATIONS

PCT Application No. PCT/EP2022/072735, "Methods and Devices for Uplink Transmission", filed on Aug. 12, 2022, pp. 1-43.
"Discussion on privacy issue in AKMA", 3GPP TSG-SA3 Meeting #109AdHoc-e, S3-230056, Agenda: 5.13, Nokia, Jan. 16-20, 2023, 3 pages.
"PCR on key issue on AKMA privacy", 3GPP TSG-SA3 Meeting #109AdHoc-e, S3-230057, Agenda: 5.13, Nokia, Jan. 16-20, 2023, 1 page.
Extended European Search Report dated Jan. 16, 2024 corresponding to European Patent Application No. 23190440.0.
Tengshun Yang et al., "Formal Analysis of 5G AKMA," Nov. 18, 2021, pp. 102-121, XP047616523.

* cited by examiner

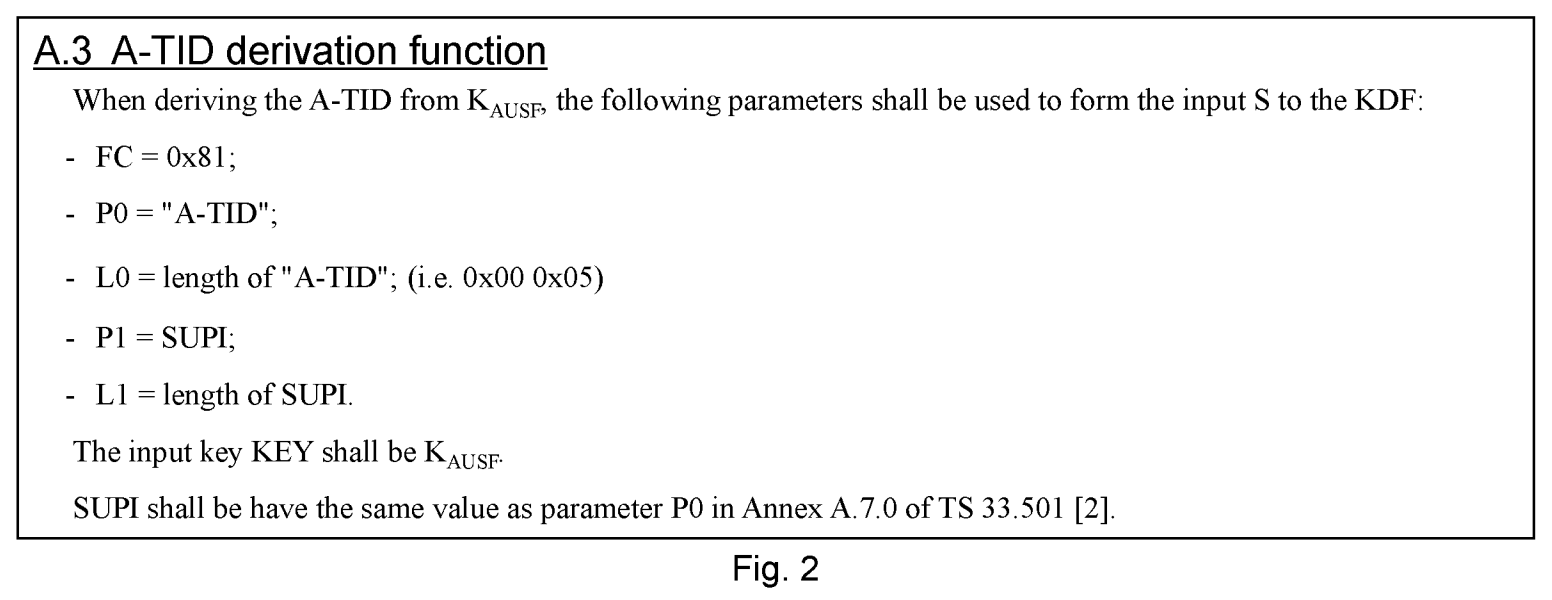

A.3 A-TID derivation function

When deriving the A-TID from $K_{AUSF}$, the following parameters shall be used to form the input S to the KDF:

- FC = 0x81;

- P0 = "A-TID";

- L0 = length of "A-TID"; (i.e. 0x00 0x05)

- P1 = SUPI;

- L1 = length of SUPI.

The input key KEY shall be $K_{AUSF}$.

SUPI shall be have the same value as parameter P0 in Annex A.7.0 of TS 33.501 [2].

Fig. 2

Figure 4:
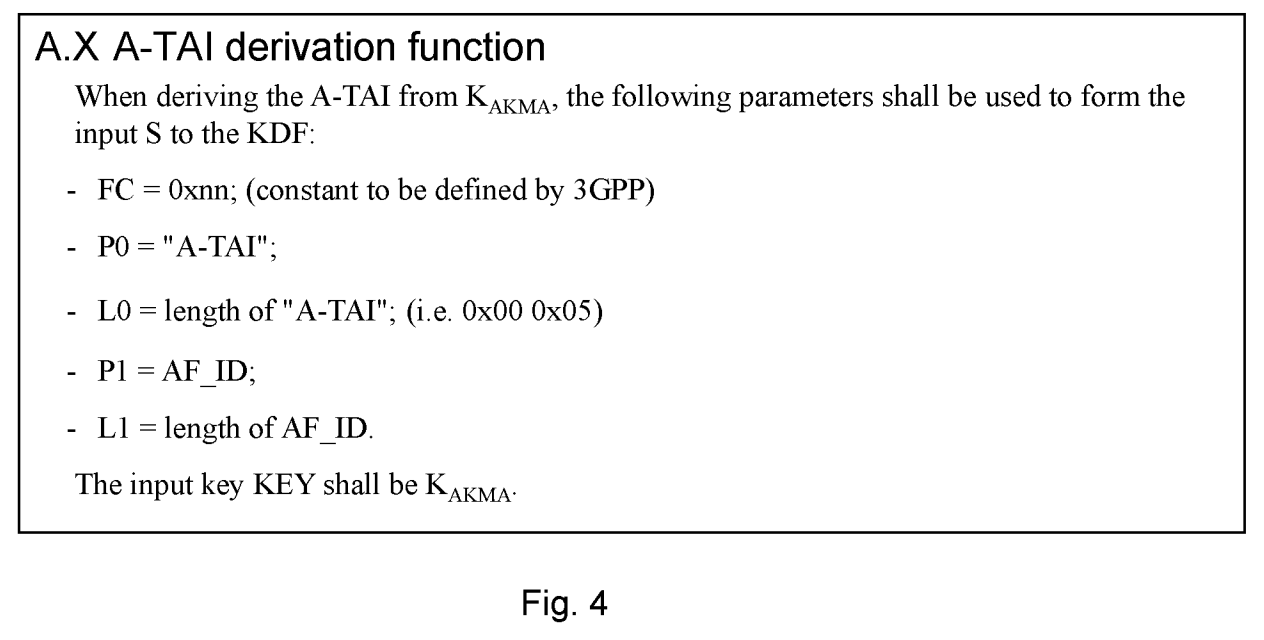

A.X A-TAI derivation function

When deriving the A-TAI from $K_{AKMA}$, the following parameters shall be used to form the input S to the KDF:

- FC = 0xnn; (constant to be defined by 3GPP)

- P0 = "A-TAI";

- L0 = length of "A-TAI"; (i.e. 0x00 0x05)

- P1 = AF_ID;

- L1 = length of AF_ID.

The input key KEY shall be $K_{AKMA}$.

Calculate temporary ID based on permanent AF ID and key agreed with network

S120

Request AF to establish session with UE (temporary ID)

110

120

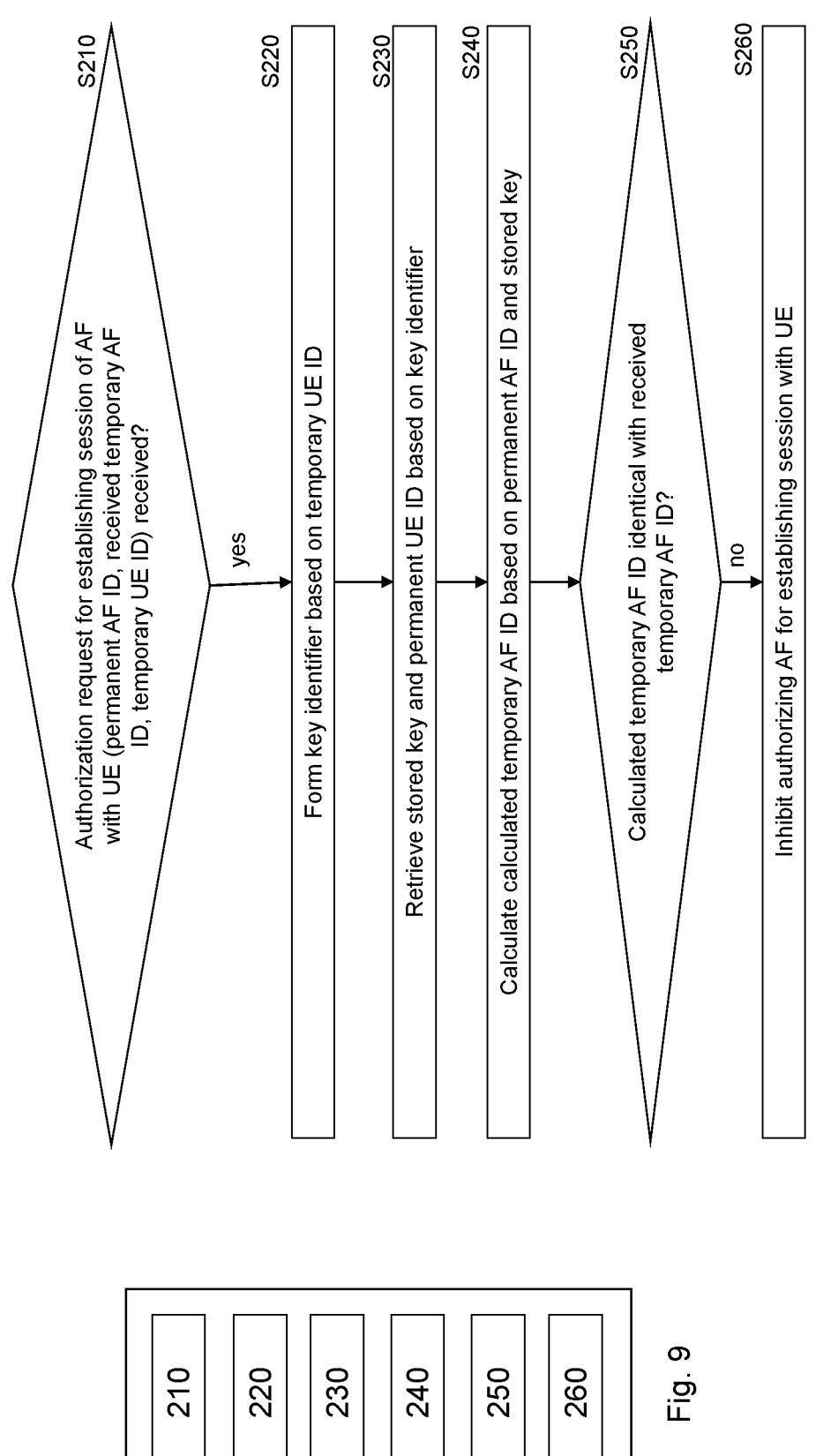

S210 — Authorization request for establishing session of AF with UE (permanent AF ID, received temporary AF ID, temporary UE ID) received?

yes

S220 — Form key identifier based on temporary UE ID

S230 — Retrieve stored key and permanent UE ID based on key identifier

S240 — Calculate calculated temporary AF ID based on permanent AF ID and stored key S250 — Calculated temporary AF ID identical with received temporary AF ID?

no

S260 — Inhibit authorizing AF for establishing session with UE

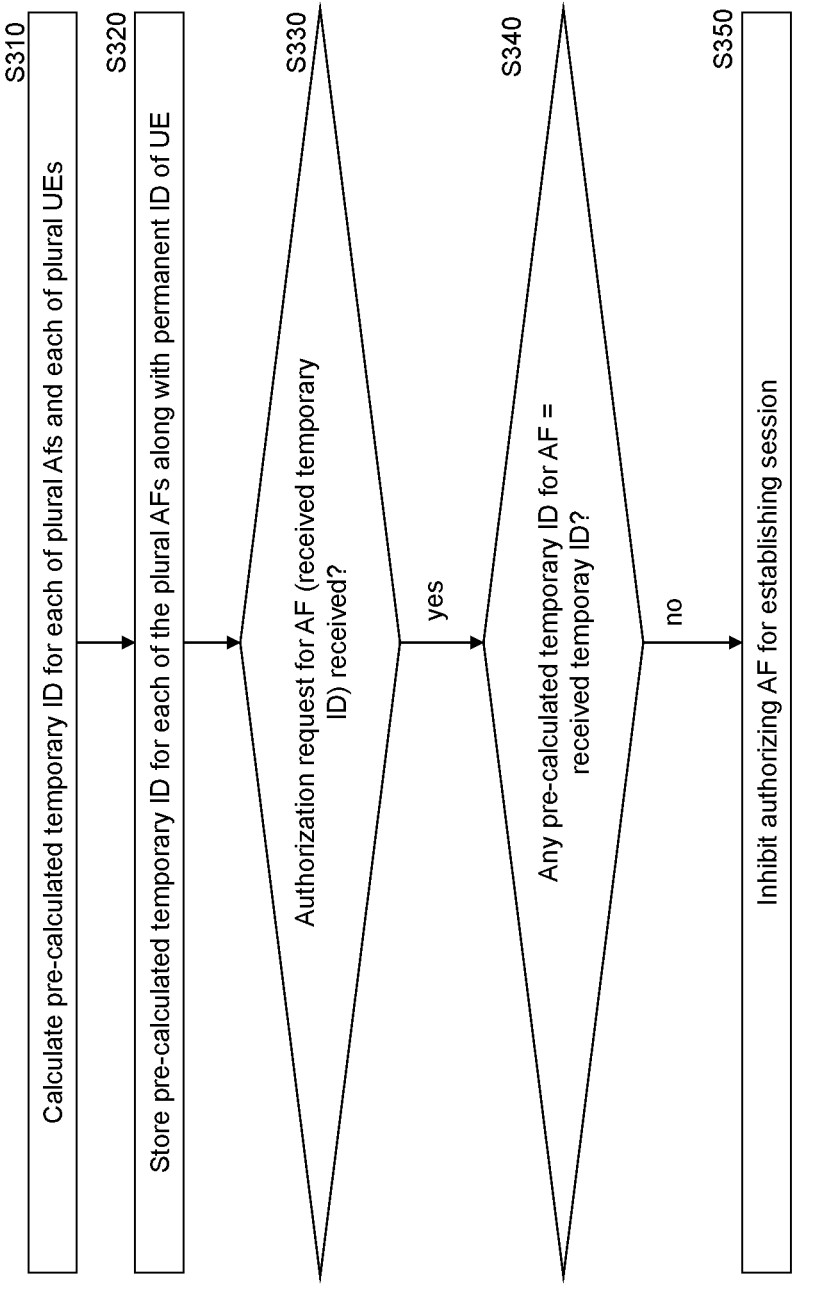

S310 Calculate pre-calculated temporary ID for each of plural Afs and each of plural UEs S320 Store pre-calculated temporary ID for each of the plural AFs along with permanent ID of UE S330 Authorization request for AF (received temporary ID) received?

yes

S340 Any pre-calculated temporary ID for AF = received temporay ID?

no

S350 Inhibit authorizing AF for establishing session

S410
Establishment request (temporary AF ID, temporary UE ID) received by AF?
yes
S420
Request authorization for establishing session between AF and UE (permanent AF ID, temporary AF ID, temporary UE ID)
Fig. 14
410
420
Fig. 13
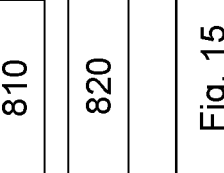
810
820
Fig. 15

KEY AND IDENTIFIER FOR SESSION ESTABLISHMENT

FIELD OF THE INVENTION

The present disclosure relates to Authentication and Key Management for Applications.

Abbreviations

3GPP 3$^{rd}$ Generation Partnership Project
5G/6G/7G 5th/6th/7th Generation
5GS 5G System
AAnF AKMA Anchor function
AF Application Function
A-KID AKMA Key Identifier
A-KID-PRIV AKMA Key Identifier with Privacy
AKMA Authentication and Key Management for Applications
A-TAI AKMA Temporary AF identifier
A-TID AKMA Temporary UE identifier
A-TID-PRIV AKMA Temporary UE Identifier with Privacy
AUSF Authentication Server Function
FQDN Fully Qualified Domain Name
GPSI Global Public Subscriber Identifier
HN Home Network
HNI Home Network Identifier
ID Identifier
KDF Key Derivation Function
NEF Network Exposure Function
RID Routing Indicator
SUPI Subscription Permanent Identifier
TS Technical Specification
UE User Equipment

BACKGROUND

In 3GPP TS 33.535, 3GPP has defined the AKMA mechanism, which allows to establish a UE and an Application Function (called AF) sharing a shared secret key (called K$_{AF}$) which can be used for session establishment.

The AKMA process defined in 3GPP TS 33.535 is illustrated in FIG. 1. As shown in FIG. 1, the actions are as follows:

1. UE and 5G system execute primary authentication and establish the key hierarchy, which includes the key K$_{AUSF}$.
2. After primary authentication (preferably: directly after primary authentication) 5G system (typically AUSF of the 5G system) executes AKMA Key Derivation and uses K$_{AUSF}$ to calculate K$_{AKMA}$, and A-KID.
   A-KID is an identifier in format username@realm. Username includes RID (routing indicator) and A-TID (AKMA temporary UE ID), realm includes the HN identifier HNI. By A-TID, the UE and its AKMA key are identified within the HN. According to 3GPP TS 33.535, A-KID shall be globally unique. A-KID shall be usable as a key identifier in protocols used in the reference point Ua*. AKMA AF shall be able to identify the AAnF serving the UE from the A-KID.
   A-TID is calculated using a cryptographic one-way function (called KDF) with the UE's SUPI and K$_{AUSF}$ as input parameters as summarized in FIG. 2. The results, K$_{AKMA}$ and A-KID and the corresponding SUPI are stored in a database using A-KID as a key identifier. Depending on the implementation, also A-TID might be used as a key identifier instead of A-KID.
3. The UE initiates the AKMA procedure and uses K$_{AUSF}$ to calculate K$_{AKMA}$ and A-KID using the same algorithms as the 5G system. In addition the UE calculates K$_{AF}$ using K$_{AKMA}$ and AF_ID as input.
   The AF_ID is a concatenation of the FQDN of the AF and Ua* security protocol identifier.
4. The UE sends a Session Establishment Request to the AF, which contains the A-KID.
   Since the A-KID does not contain the identity of the UE in plain text, the privacy of the UE is protected.
   The request may also contain an indicator indicating that A-KID identifier identifies an AKMA key, for instance "3GPP-AKMA".
5. The AF sends a AKMA AFKey Request via the Network Exposure Function (if the AF is external to the network and non-trusted) to AUSF (directly to AUSF if the AF is trusted or belongs to the 5G system) of the 5G system. The request contains the A-KID and the AF_ID.
6. If the AF is external to the network and non-trusted, the NEF authorizes the request, i.e., the 5G system checks that the AF is allowed to make requests for the provided AF_ID.
7. The 5G system (AAnF) uses A-KID (or depending on implementation A-TID) as a search key and fetches the K$_{AKMA}$ computed in step 2 and the SUPI from the database.
   The 5G system calculates K$_{AF}$ using K$_{AKMA}$ and AF_ID as input.
8. The 5G system returns the K$_{AF}$ together with the GPSI to the AF.
   The 5G system returns the Generic Public Subscriber Identifier because the SUPI is intended for usage only within the 5G system, and here, we assume an external AF (an internal AF would get the SUPI).
9. At this point of time, the AF knows the identity of the UE, and the UE and AF have a shared secret, i.e., K$_{AF}$. Thus, AF and UE can continue with the Session Establishment.

The AAnF is the anchor function in the HPLMN. The AAnF stores the AKMA Anchor Key (K$_{AKMA}$) and SUPI for AKMA service, which is received from the AUSF after the UE completes a successful 5G primary authentication. The AAnF also generates the key material to be used between the UE and the Application Function (AF) and maintains UE AKMA contexts. The AAnF sends SUPI of the UE to AF located inside the operators network according to the AF request or sends GPSI to NEF if the AF is located outside the operator's network, unless the access request is anonymous.

SUMMARY

It is an object of the present invention to improve the prior art.

According to a first aspect of the invention, there is provided an apparatus comprising:
   one or more processors and memory storing instructions that, when executed by the one or more processors, cause the apparatus to perform:
   calculating a temporary identifier for an establishment request based on a permanent identifier of an application function and a first key agreed between a terminal and a network;

requesting the application function, by an establishment request, to establish a session with the terminal, wherein the establishment request comprises the temporary identifier for the establishment request.

The instructions, when executed by the one or more processors, may cause the apparatus to perform the calculating the temporary identifier for the establishment request by calculating a temporary identifier of the application function using a first cryptographic one-way function with the permanent identifier of the application function and the first key or a derived key as input parameters, wherein the derived key is derived from the first key, and combining the temporary identifier of the application function with a temporary identifier of the terminal to obtain the temporary identifier for the establishment request.

The instructions, when executed by the one or more processors, may further cause the apparatus to perform calculating the temporary identifier of the terminal by a second cryptographic one-way function with a permanent identifier of the terminal and one of the first key and the derived key, as input parameters.

The first cryptographic one-way function may be the same as the second cryptographic one-way function.

The instructions, when executed by the one or more processors, may cause the apparatus to perform the combining by one of concatenating the temporary identifier of the application function and the temporary identifier of the terminal to obtain the temporary identifier for the establishment request; and interleaving portions of the temporary identifier of the application function and portions of the temporary identifier of the terminal to obtain the temporary identifier for the establishment request.

The instructions, when executed by the one or more processors, may cause the apparatus to perform the calculating the temporary identifier for the establishment request by inputting the permanent identifier of the application function, the first key or a derived key, and a permanent identifier of the terminal into a third cryptographic one-way function to obtain the temporary identifier for the establishment request as an output from the third cryptographic one-way function, wherein the derived key is derived from the first key.

According to a second aspect of the invention, there is provided an apparatus comprising:

one or more processors and memory storing instructions that, when executed by the one or more processors, cause the apparatus to perform:

monitoring whether a network receives an authorization request for establishing a session of an application function with a terminal, wherein the authorization request comprises a permanent identifier of the application function, a received temporary identifier of the application function, and a temporary identifier of a terminal;

if the authorization request is received:

forming a key identifier based on the temporary identifier of the terminal;

retrieving, from a data repository, based on the key identifier, a stored key and a first permanent identifier of the terminal;

calculating a calculated temporary identifier of the application function based on the permanent identifier of the application function and the stored key;

checking whether the calculated temporary identifier of the application function is identical with the received temporary identifier of the application function;

inhibiting authorizing the application function for the establishing the session with the terminal if the calculated temporary identifier of the application function is not identical with the received temporary identifier of the application function.

The instructions, when executed by the one or more processors, may cause the apparatus to perform the forming the key identifier based on the temporary identifier of the terminal and a first key agreed between the terminal by the network.

The instructions, when executed by the one or more processors, may further cause the apparatus to perform authorizing the application function for the establishing the session with the terminal by an authorization message to the application function if the calculated temporary identifier of the application function is identical with the received temporary identifier of the application function, wherein the authorization message comprises a second permanent identifier of the terminal and a key for the establishing the session.

The instructions, when executed by the one or more processors, may further cause the apparatus to perform retrieving the second permanent identifier of the terminal from the data repository based on the first permanent identifier of the terminal.

The instructions, when executed by the one or more processors, may further cause the apparatus to perform calculating the key for the establishing the session based on the permanent identifier of the application function and the first key.

According to a third aspect of the invention, there is provided an a Apparatus comprising:

one or more processors and memory storing instructions that, when executed by the one or more processors, cause the apparatus to perform:

calculating, for each of one or more application functions and for each of one or more terminals, a pre-calculated temporary identifier for an establishment request for establishing a session between the respective terminal and the respective application function by inputting a first permanent identifier of the respective terminal, a permanent identifier of the respective application function, and a first key agreed between the respective terminal and a network into a cryptographic one-way function to obtain the pre-calculated temporary identifier for the establishment request for the establishing the session between the respective terminal and the respective application function as an output from the cryptographic one-way function;

storing, for the permanent identifier of each of the one or more application functions, in a data repository, the pre-calculated temporary identifier for the establishment request for the establishing the session between the respective terminal and the respective application function along with a second permanent identifier of the respective terminal;

monitoring whether the network receives an authorization request for authorizing one of the one or more application functions for establishing the session with the one of the one or more application functions, wherein the authorization request comprises a received temporary identifier for the establishment request and the permanent identifier of the one of the one or more application functions;

if the network receives the authorization request:

checking whether, for the permanent identifier of the one of the one or more application functions, one of the one or more stored pre-calculated temporary identifiers for the establishment request is identical with the received temporary identifier for the establishment request;

inhibiting the authorizing the application function for the establishing the session with the one of the one or more application functions if, for the permanent identifier of the one of the one or more application functions, each of the one or more stored pre-calculated temporary identifiers for the establishment request is not identical with the received temporary identifier for the establishment request.

The instructions, when executed by the one or more processors, may further cause the apparatus to perform, if, for the permanent identifier of the one of the one or more application functions, one of the one or more pre-calculated temporary identifiers for the establishment request is identical with the received temporary identifier for the establishment request:

retrieving the second permanent identifier of a first terminal of the one or more terminals stored along with the respective pre-calculated temporary identifier for the establishment request being identical with the received temporary identifier for the establishment request;

authorizing the one of the one or more application functions for the establishing the session between the first terminal and the one of the one or more application functions by an authorization message to the one of the one or more application functions, wherein the authorization message comprises a third permanent identifier of the first terminal and a key for the establishing the session between the first terminal and the respective application function.

The instructions, when executed by the one or more processors, may further cause the apparatus to perform calculating the key for the establishing the session between the first terminal and the respective application function based on the permanent identifier of the respective application function and the first key of the first terminal.

The instructions, when executed by the one or more processors, may further cause the apparatus to perform storing the key for the establishing the session between the first terminal and the respective application function along with the pre-calculated temporary identifier for the establishment request between the first terminal and the respective application function in the data repository;

retrieving the key for the establishing the session stored for the one of the one or more application functions along with the one of the pre-calculated temporary identifiers for the establishment request if, for the one of the one or more application functions, the one of the pre-calculated temporary identifiers for the establishment request stored along with the second permanent identifier of the first terminal is identical with the received temporary identifier for the establishment request.

According to a fourth aspect of the invention, there is provided an apparatus comprising:

one or more processors and memory storing instructions that, when executed by the one or more processors, cause the apparatus to perform:

monitoring whether an application function receives an establishment request, wherein the establishment request requests to establish a session between the application function and a terminal, wherein the establishment request comprises a temporary identifier for the establishment request;

requesting, from a network by an authorization request, an authorization for the establishing the session between the application function and the terminal if the application function receives the establishment request, wherein the authorization request comprises a permanent identifier of the application function and the temporary identifier for the establishment request.

According to a fifth aspect of the invention, there is provided a method comprising:

calculating a temporary identifier for an establishment request based on a permanent identifier of an application function and a first key agreed between a terminal and a network;

requesting the application function, by an establishment request, to establish a session with the terminal, wherein the establishment request comprises the temporary identifier for the establishment request.

The calculating the temporary identifier for the establishment request may comprise calculating a temporary identifier of the application function using a first cryptographic one-way function with the permanent identifier of the application function and the first key or a derived key as input parameters, wherein the derived key is derived from the first key, and combining the temporary identifier of the application function with a temporary identifier of the terminal to obtain the temporary identifier for the establishment request.

The method may further comprise calculating the temporary identifier of the terminal by a second cryptographic one-way function with a permanent identifier of the terminal and one of the first key and the derived key, as input parameters.

The first cryptographic one-way function may be the same as the second cryptographic one-way function.

The combining may comprise one of concatenating the temporary identifier of the application function and the temporary identifier of the terminal to obtain the temporary identifier for the establishment request; and interleaving portions of the temporary identifier of the application function and portions of the temporary identifier of the terminal to obtain the temporary identifier for the establishment request.

The calculating the temporary identifier for the establishment request may comprise inputting the permanent identifier of the application function, the first key or a derived key, and a permanent identifier of the terminal into a third cryptographic one-way function to obtain the temporary identifier for the establishment request as an output from the third cryptographic one-way function, wherein the derived key is derived from the first key.

According to a sixth aspect of the invention, there is provided a method comprising:

monitoring whether a network receives an authorization request for establishing a session of an application function with a terminal, wherein the authorization request comprises a permanent identifier of the application function, a received temporary identifier of the application function, and a temporary identifier of a terminal;

if the authorization request is received:

forming a key identifier based on the temporary identifier of the terminal;

retrieving, from a data repository, based on the key identifier, a stored key and a first permanent identifier of the terminal;

calculating a calculated temporary identifier of the application function based on the permanent identifier of the application function and the stored key;

checking whether the calculated temporary identifier of the application function is identical with the received temporary identifier of the application function;

inhibiting authorizing the application function for the establishing the session with the terminal if the calculated temporary identifier of the application function is not identical with the received temporary identifier of the application function.

The key identifier may be formed based on the temporary identifier of the terminal and a first key agreed between the terminal by the network.

The method may further comprise authorizing the application function for the establishing the session with the terminal by an authorization message to the application function if the calculated temporary identifier of the application function is identical with the received temporary identifier of the application function, wherein the authorization message comprises a second permanent identifier of the terminal and a key for the establishing the session.

The method may further comprise retrieving the second permanent identifier of the terminal from the data repository based on the first permanent identifier of the terminal.

The method may further comprise calculating the key for the establishing the session based on the permanent identifier of the application function and the first key.

According to a seventh aspect of the invention, there is provided a method comprising:

calculating, for each of one or more application functions and for each of one or more terminals, a pre-calculated temporary identifier for an establishment request for establishing a session between the respective terminal and the respective application function by inputting a first permanent identifier of the respective terminal, a permanent identifier of the respective application function, and a first key agreed between the respective terminal and a network into a cryptographic one-way function to obtain the pre-calculated temporary identifier for the establishment request for the establishing the session between the respective terminal and the respective application function as an output from the cryptographic one-way function;

storing, for the permanent identifier of each of the one or more application functions, in a data repository, the pre-calculated temporary identifier for the establishment request for the establishing the session between the respective terminal and the respective application function along with a second permanent identifier of the respective terminal;

monitoring whether the network receives an authorization request for authorizing one of the one or more application functions for establishing the session with the one of the one or more application functions, wherein the authorization request comprises a received temporary identifier for the establishment request and the permanent identifier of the one of the one or more application functions;

if the network receives the authorization request:

checking whether, for the permanent identifier of the one of the one or more application functions, one of the one or more stored pre-calculated temporary identifiers for the establishment request is identical with the received temporary identifier for the establishment request;

inhibiting the authorizing the application function for the establishing the session with the one of the one or more application functions if, for the permanent identifier of the one of the one or more application functions, each of the one or more stored pre-calculated temporary identifiers for the establishment request is not identical with the received temporary identifier for the establishment request;

The method may further comprise if, for the permanent identifier of the one of the one or more application functions, one of the one or more pre-calculated temporary identifiers for the establishment request is identical with the received temporary identifier for the establishment request:

retrieving the second permanent identifier of a first terminal of the one or more terminals stored along with the respective pre-calculated temporary identifier for the establishment request being identical with the received temporary identifier for the establishment request;

authorizing the one of the one or more application functions for the establishing the session between the first terminal and the one of the one or more application functions by an authorization message to the one of the one or more application functions, wherein the authorization message comprises a third permanent identifier of the first terminal and a key for the establishing the session between the first terminal and the respective application function.

The method may further comprise calculating the key for the establishing the session between the first terminal and the respective application function based on the permanent identifier of the respective application function and the first key of the first terminal.

The method may further comprise storing the key for the establishing the session between the first terminal and the respective application function along with the pre-calculated temporary identifier for the establishment request between the first terminal and the respective application function in the data repository;

retrieving the key for the establishing the session stored for the one of the one or more application functions along with the one of the pre-calculated temporary identifiers for the establishment request if, for the one of the one or more application functions, the one of the pre-calculated temporary identifiers for the establishment request stored along with the second permanent identifier of the first terminal is identical with the received temporary identifier for the establishment request.

According to an eighth aspect of the invention, there is provided a method comprising:

monitoring whether an application function receives an establishment request, wherein the establishment request requests to establish a session between the application function and a terminal, wherein the establishment request comprises a temporary identifier for the establishment request;

requesting, from a network by an authorization request, an authorization for the establishing the session between the application function and the terminal if the application function receives the establishment request, wherein the authorization request comprises a permanent identifier of the application function and the temporary identifier for the establishment request.

Each of the methods of the fifth to eighth aspects may be a method of protecting privacy.

According to a ninth aspect of the invention, there is provided an apparatus comprising:

means for calculating a temporary identifier for an establishment request based on a permanent identifier of an application function and a first key agreed between a terminal and a network;

means for requesting the application function, by an establishment request, to establish a session with the terminal, wherein the establishment request comprises the temporary identifier for the establishment request.

According to a tenth aspect of the invention, there is provided an apparatus comprising:

means for monitoring whether a network receives an authorization request for establishing a session of an application function with a terminal, wherein the authorization request comprises a permanent identifier of the application function, a received temporary identifier of the application function, and a temporary identifier of a terminal;

means for forming a key identifier based on the temporary identifier of the terminal if the authorization request is received;

means for retrieving, from a data repository, based on the key identifier, a stored key and a first permanent identifier of the terminal if the authorization request is received;

means for calculating a calculated temporary identifier of the application function based on the permanent identifier of the application function and the stored key if the authorization request is received;

means for checking whether the calculated temporary identifier of the application function is identical with the received temporary identifier of the application function if the authorization request is received;

means for inhibiting authorizing the application function for the establishing the session with the terminal if the calculated temporary identifier of the application function is not identical with the received temporary identifier of the application function if the authorization request is received.

According to a eleventh aspect of the invention, there is provided an apparatus comprising:

means for calculating, for each of one or more application functions and for each of one or more terminals, a pre-calculated temporary identifier for an establishment request for establishing a session between the respective terminal and the respective application function by inputting a first permanent identifier of the respective terminal, a permanent identifier of the respective application function, and a first key agreed between the respective terminal and a network into a cryptographic one-way function to obtain the pre-calculated temporary identifier for the establishment request for the establishing the session between the respective terminal and the respective application function as an output from the cryptographic one-way function;

means for storing, for the permanent identifier of each of the one or more application functions, in a data repository, the pre-calculated temporary identifier for the establishment request for the establishing the session between the respective terminal and the respective application function along with a second permanent identifier of the respective terminal;

means for monitoring whether the network receives an authorization request for authorizing one of the one or more application functions for establishing the session with the one of the one or more application functions, wherein the authorization request comprises a received temporary identifier for the establishment request and the permanent identifier of the one of the one or more application functions;

means for checking whether, for the permanent identifier of the one of the one or more application functions, one of the one or more stored pre-calculated temporary identifiers for the establishment request is identical with the received temporary identifier for the establishment request if the network receives the authorization request;

means for inhibiting the authorizing the application function for the establishing the session with the one of the one or more application functions if, for the permanent identifier of the one of the one or more application functions, each of the one or more stored pre-calculated temporary identifiers for the establishment request is not identical with the received temporary identifier for the establishment request if the network receives the authorization request.

According to a twelfth aspect of the invention, there is provided an apparatus comprising:

means for monitoring whether an application function receives an establishment request, wherein the establishment request requests to establish a session between the application function and a terminal, wherein the establishment request comprises a temporary identifier for the establishment request;

means for requesting, from a network by an authorization request, an authorization for the establishing the session between the application function and the terminal if the application function receives the establishment request, wherein the authorization request comprises a permanent identifier of the application function and the temporary identifier for the establishment request.

According to a thirteenth aspect of the invention, there is provided a computer program product comprising a set of instructions which, when executed on an apparatus, is configured to cause the apparatus to carry out the method according to any of the fifth to eighth aspects. The computer program product may be embodied as a computer-readable medium or directly loadable into a computer. In particular, there are provided:

A computer readable medium comprising instructions stored thereon for performing at least the following:

calculating a temporary identifier for an establishment request based on a permanent identifier of an application function and a first key agreed between a terminal and a network;

requesting the application function, by an establishment request, to establish a session with the terminal, wherein the establishment request comprises the temporary identifier for the establishment request.

A computer readable medium comprising instructions stored thereon for performing at least the following:

monitoring whether a network receives an authorization request for establishing a session of an application function with a terminal, wherein the authorization request comprises a permanent identifier of the application function, a received temporary identifier of the application function, and a temporary identifier of a terminal;

if the authorization request is received:

forming a key identifier based on the temporary identifier of the terminal;

retrieving, from a data repository, based on the key identifier, a stored key and a first permanent identifier of the terminal;

calculating a calculated temporary identifier of the application function based on the permanent identifier of the application function and the stored key;

checking whether the calculated temporary identifier of the application function is identical with the received temporary identifier of the application function;

inhibiting authorizing the application function for the establishing the session with the terminal if the calculated temporary identifier of the application function is not identical with the received temporary identifier of the application function.

A computer readable medium comprising instructions stored thereon for performing at least the following:

calculating, for each of one or more application functions and for each of one or more terminals, a pre-calculated temporary identifier for an establishment request for establishing a session between the respective terminal and the respective application function by inputting a first permanent identifier of the respective terminal, a permanent identifier of the respective application function, and a first key agreed between the respective terminal and a network into a cryptographic one-way function to obtain the pre-calculated temporary identifier for the establishment request for the establishing the session between the respective terminal and the respective application function as an output from the cryptographic one-way function;

storing, for the permanent identifier of each of the one or more application functions, in a data repository, the pre-calculated temporary identifier for the establishment request for the establishing the session between the respective terminal and the respective application function along with a second permanent identifier of the respective terminal;

monitoring whether the network receives an authorization request for authorizing one of the one or more application functions for establishing the session with the one of the one or more application functions, wherein the authorization request comprises a received temporary identifier for the establishment request and the permanent identifier of the one of the one or more application functions;

if the network receives the authorization request:

checking whether, for the permanent identifier of the one of the one or more application functions, one of the one or more stored pre-calculated temporary identifiers for the establishment request is identical with the received temporary identifier for the establishment request;

inhibiting the authorizing the application function for the establishing the session with the one of the one or more application functions if, for the permanent identifier of the one of the one or more application functions, each of the one or more stored pre-calculated temporary identifiers for the establishment request is not identical with the received temporary identifier for the establishment request;

A computer readable medium comprising instructions stored thereon for performing at least the following:

monitoring whether an application function receives an establishment request, wherein the establishment request requests to establish a session between the application function and a terminal, wherein the establishment request comprises a temporary identifier for the establishment request;

requesting, from a network by an authorization request, an authorization for the establishing the session between the application function and the terminal if the application function receives the establishment request, wherein the authorization request comprises a permanent identifier of the application function and the temporary identifier for the establishment request.

According to some embodiments of the invention, at least one of the following advantages may be achieved:

privacy of UE is ensured;

no need for new messages;

existing calculation methods may be reused.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIG. 2 shows a calculation of A-TID according to 3GPP TS 33.535, Annex 3;

FIG. 4 shows a calculation of A-TAI according to some example embodiments of the invention;

FIG. 9 shows an apparatus according to an example embodiment of the invention;

FIG. 10 shows a method according to an example embodiment of the invention;

FIG. 11 shows an apparatus according to an example embodiment of the invention;

FIG. 12 shows a method according to an example embodiment of the invention;

FIG. 13 shows an apparatus according to an example embodiment of the invention;

FIG. 14 shows a method according to an example embodiment of the invention; and FIG. 15 shows an apparatus according to an example embodiment of the invention.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Figure 3:
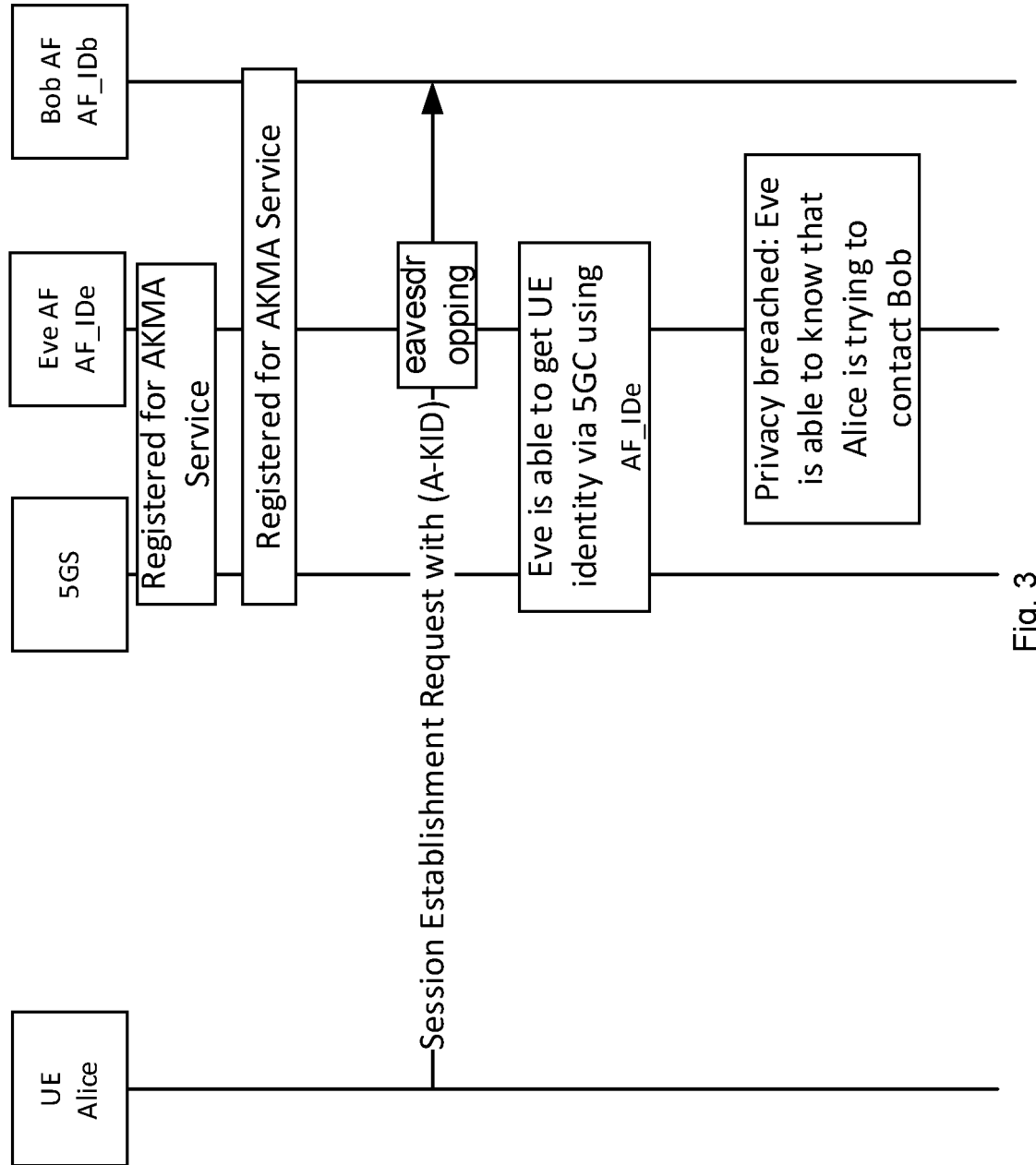
FIG. 3 shows a message sequence chart illustrating a technical problem solved by some example embodiments of the invention.

The way, how the 5G system conventionally authorizes AKMA AF Key Requests might lead to potential privacy violations, although the UE does not provide its identity in plaintext to the AF. This is illustrated by the attack scenario of FIG. 3:

As shown in FIG. 3, two entities, called Bob and Eve, are running AFs and have registered for usage of AKMA services at a same mobile operator. Note, that both entities use different AF_IDs.

UE Alice wants to establish a secure connection with Bob's AF and sends a conventional Session Establishment Request to Bob's AF. The request contains the A-KID.

Eve is acting as an eavesdropper and can obtain A-KID from the intercepted message. Since A-KID does not contain a permanent UE identifier, the knowledge of A-KID is of no direct use for Eve. However, Eve can use its AF to send AKMA AF Key Request (i.e., an authorization request according to action 5 of FIG. 1) to the 5G system using the intercepted A-KID and its own AF_ID as input.

Since the 5G system has no means to find out that the A-KID was not intended for Eve, the 5G system will handle the request and return $K_{AF}$ together with Alice's GPSI to Eve.

Please note, that $K_{AF}$ is of no use for Eve, because Alice and the 5G system were using different AF_IDs for the calculation of $K_{AF}$ (i.e., Alice was using Bob's AF_ID, while the 5G system was using Eve's AF_ID). However, Eve is now in possession of Alice's GPSI (typically, Alice's telephone number) and knows that Alice started to establish a session with Bob. Thus, privacy of Alice is breached.

Some example embodiments of this invention fix this privacy violation in the 3GPP AKMA procedure. This is done by adding information about the intended application to the encrypted identifier, which is sent by UE to the AF during Session Establishment request.

In this way, the root cause of the vulnerability is fixed, i.e., the same encrypted identifier cannot be used by different AFs any longer to obtain an AKMA key (and, thus, an UE identifier such as GPSI) from the 5G system.

In detail, the method works as follows:

A-KID is an identifier in format username@realm. Username includes RID (routing indicator) and A-TID (AKMA temporary UE ID), realm includes the HN identifier HNI. By A-TID, the UE and its AKMA key are identified within the HN.

A root cause of the identified privacy issue is the circumstance, that the A-KID used in the AKMA session establishment is independent from the AF identifier (e.g., AF_ID).

Therefore, a privacy conserving parameter (hereinafter denoted A-KID-PRIV) is defined which is used in the session establishment request from UE to AF instead of A_KID. A-KID-PRIV may be constructed from A-TID-PRIV in the same way as A-KID is constructed from A-TID. A-TID-PRIV is based on a temporary identity of the UE and a temporary identity of the AF. Thus, A-TID-PRIV is AF-specific.

A-KID-PRIV may be in NAI format as specified in clause 2.2 of IETF RFC 7542, i.e. username@realm. The username part may include the RID, A-TID (AKMA Temporary UE Identifier) and the A-TAI, and the realm part shall include Home Network Identifier. RID, A-TID and A-TAI may be separated by a delimiter so that AAnF can differentiate the different attributes in the username. As another option, their lengths may be predefined such that the delimiter may be omitted.

Example

"<username>©<realm>", wherein, <username> shall include Routing Indicator, the A-TID and A-TAI in the format "rid<value>.atid<value>.atai<value>", where "rid", "atid" and "atai" are labels indicating Routing Indicator, A-TID, A-TAI and <realm> shall include Home Network Id.

Example

If Routing Indicator: 012, A-TID: 019345346, A-TAI: 1242353466 and Home Network Id: 5gc.mnc012.mcc345.3gppnetwork.org, then
AKId:
rid012.akid019345346.atail242353466©5gc.mnc012.mcc345.3gppnetwork.org A-TID-PRIV may be defined as a combination of A-TID and A-TAI (AKMA-temporary AF-specific ID). For example, A-TID-PRIV may be a concatenation of A-TID and A-TAI.

A-TID may be calculated as defined in Annex A.3 of 3GPP TS 33.535 (i.e., as shown in FIG. 2) or by some other cryptographic one-way function.

A-TAI is calculated using a corresponding method as used for calculating A-TID. For example, A-TAI may be calculated using the same or another cryptographic one-way function as used for calculating A-TID. In the example that the same cryptographic one-way function is used, the differences between calculating A-TAI and A-TID are that:

P0 is set to "A-TAI"
L0 is length of "A-TAI"
AF_ID is used as input parameter P1
length of AF_ID as input parameter L1. AF_ID is as defined in 3GPP TS 33.535 Annex A.4.
$K_{AKMA}$ is used as input key.

Note: $K_{AKMA}$ is used as input key instead of $K_{AUSF}$ to facilitate the verification of A-TAI during processing AKMA AFKey Requests. The network function that needs to verify an A-TAI (i.e., the AAnF) does not need to be in possession of $K_{AUSF}$ In this way the design principle of the 5G architecture, that only the AUSF is in possession of $K_{AUSF}$ is preserved. However, in some example embodiments, $K_{AUSF}$ instead of $K_{AKMA}$ may be used as the input key.

The resulting algorithm for calculating A-TAI according to some example embodiments of the invention is summarized in FIG. 4. The relationship between all these identifiers according to some example embodiments of the invention is

Figures 5A, 5B:
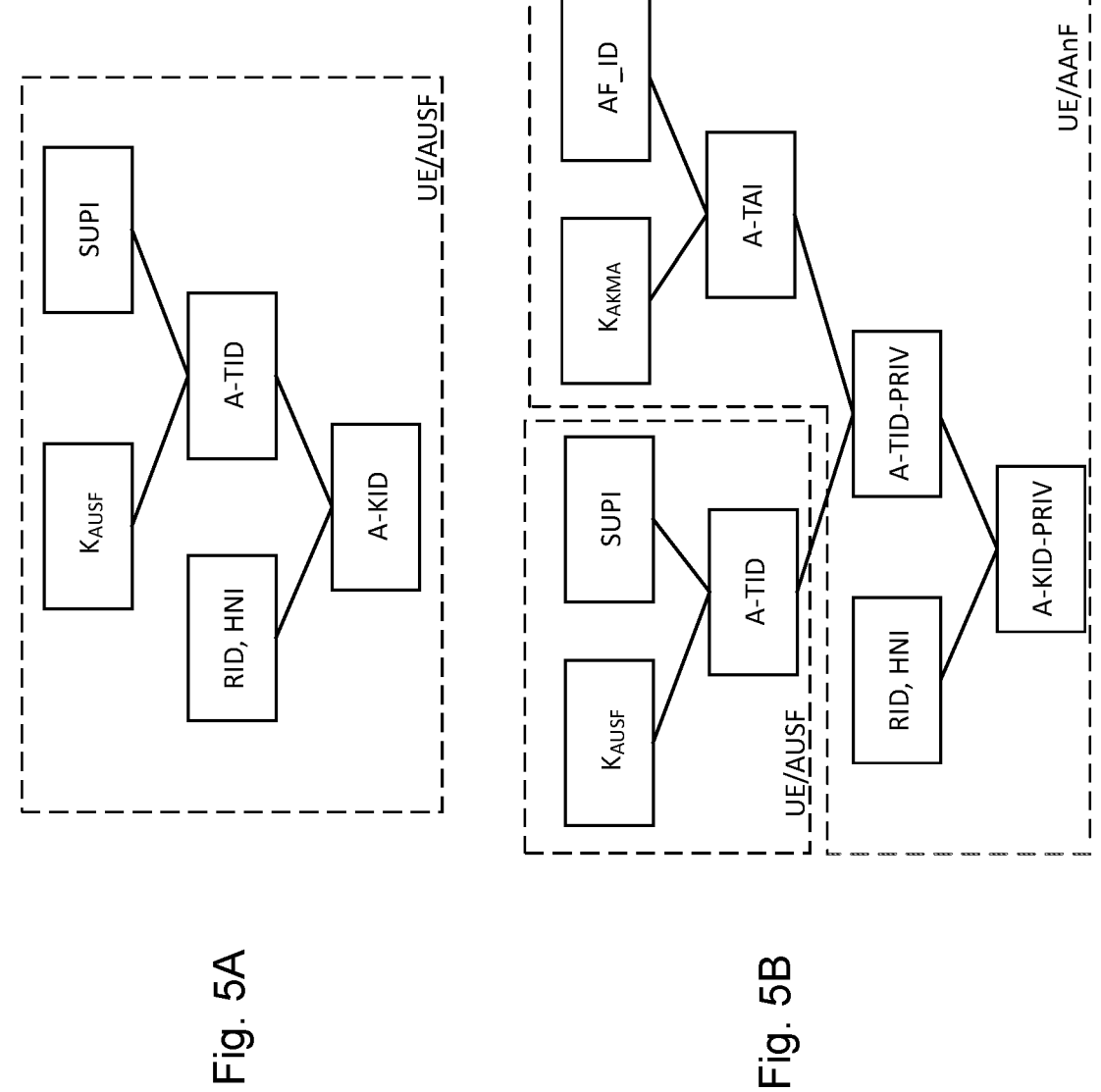
FIG. 5A shows existing AKMA identifiers and their relationship.
FIG. 5B shows AKMA identifiers and their relationship according to some example embodiments of the invention.

15 visualized in FIGS. 5A and 5B. In FIG. 5A, the identifiers according to conventional 3GPP TS 33.535 are shown, whereas FIG. 5B shows the identifiers according to some example embodiments of the invention. Dashed boxes indicate the network functions, which may calculate the identifiers enclosed by the dashed boxes, wherein UE/AUSF and UE/AAnF mean that the respective parameters are to be calculated in UE AND in AUSF and AAnF, respectively. AAnF may be a part of AUSF.

As an option A-TID-PRIV might not be defined as a combination of A-TID and A-TAI, but as a direct result of a calculation using a cryptographic one-way function using SUPI and AF_ID or any suitable combination of both as input. In the example that the same cryptographic one-way function is used as it is used for calculating A-TID, the differences between calculating A-TID-PRIV and A-TID are that:

P0 is set to "A-TID-PRIV"
L0 is length of "A-TID-PRIV"
SUPI as input parameter P1
length of P1 as L1.
AF_ID is used as input parameter P2
length of P2 as L2.
$K_{AUSF}$ is used as input key.

Figure 1:
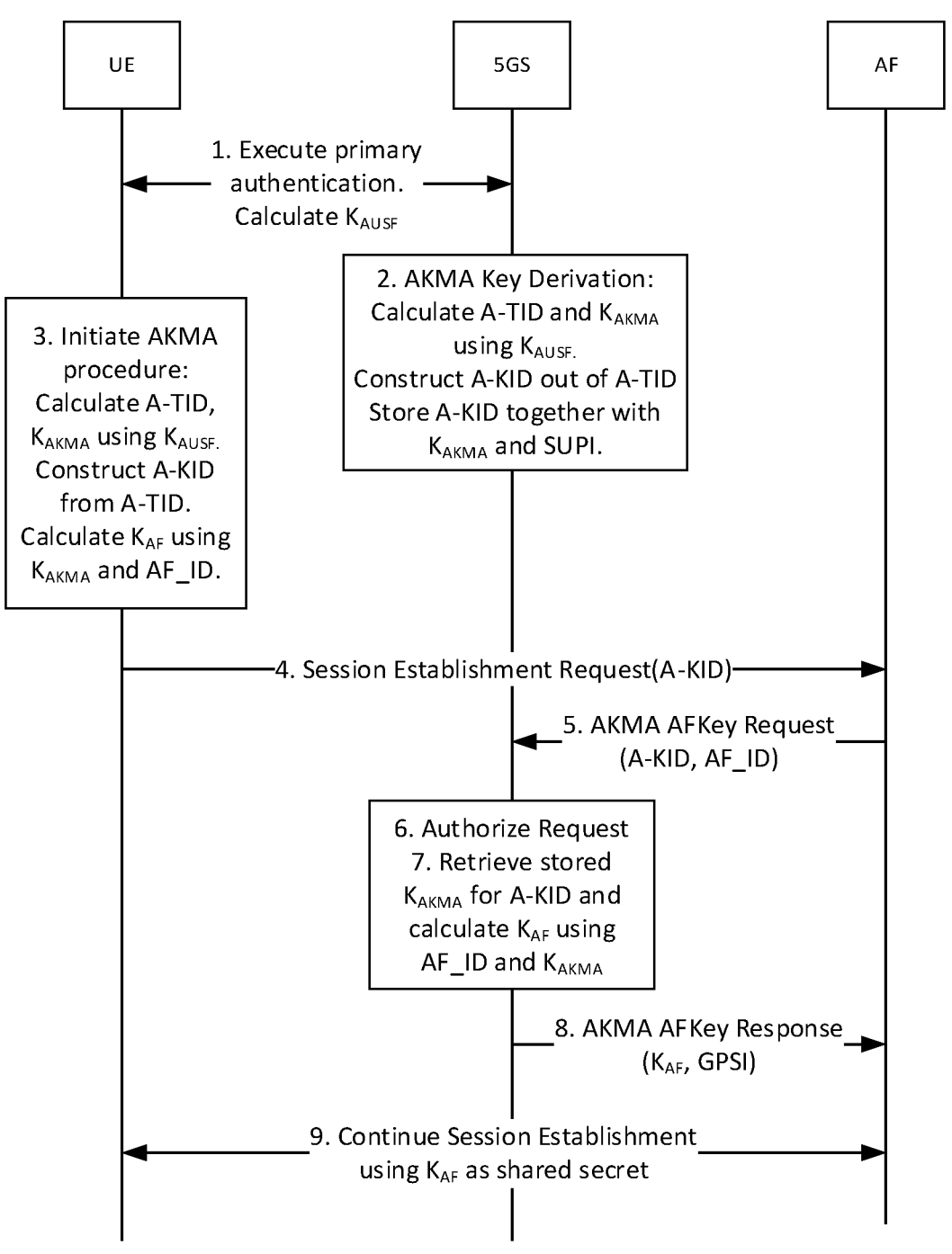
FIG. 1 shows a message sequence chart according to 3GPP TS 33.535.
Figure 6:
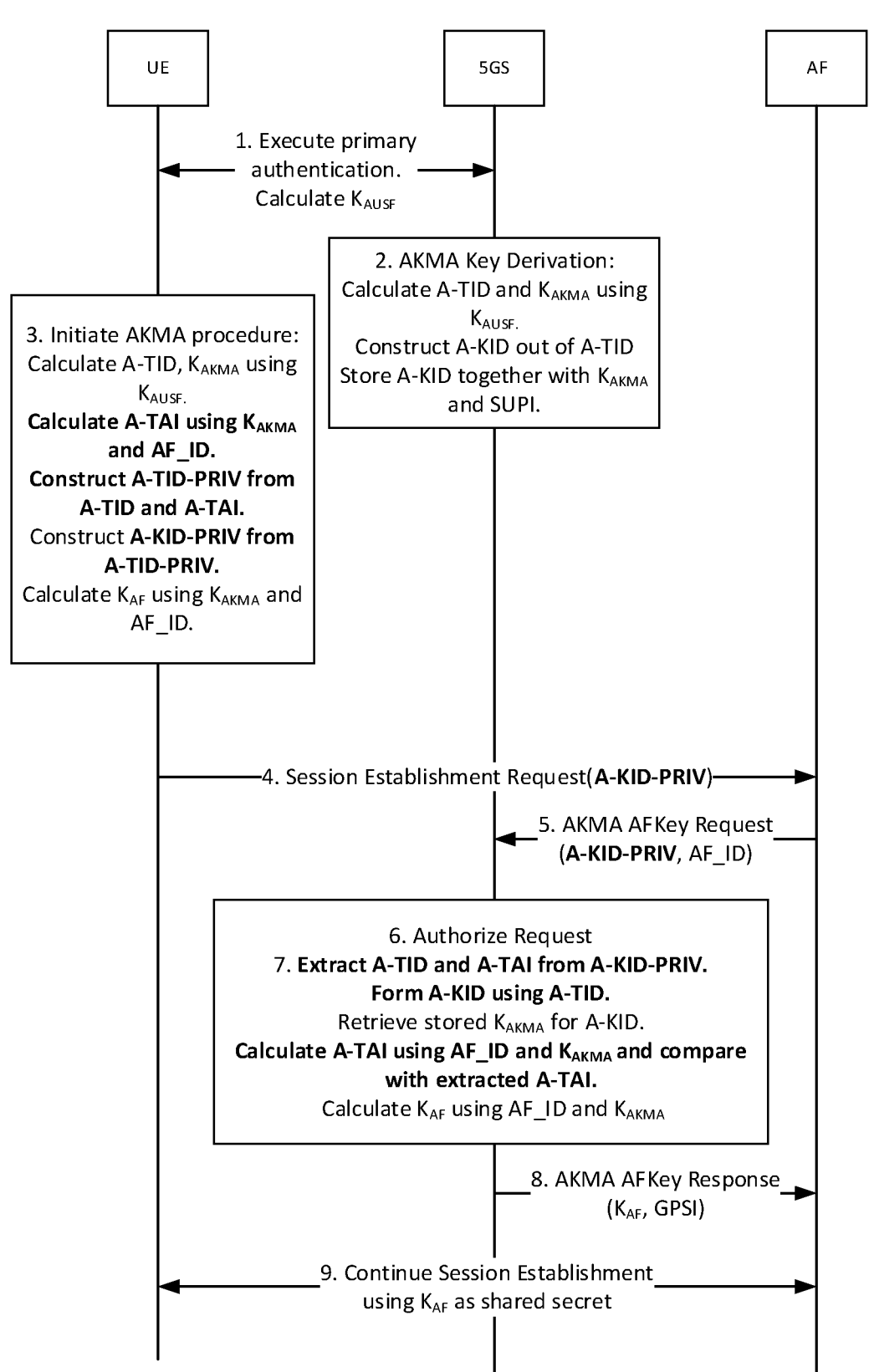
FIG. 6 shows a message sequence chart according to some example embodiments of the invention.

FIG. 6 illustrates a message sequence chart according to some example embodiments of the invention using A-TID-PRIV. FIG. 6 is a modified version of FIG. 1. Some modifications over FIG. 1 are highlighted in bold and they are discussed hereinafter.

The actions in FIG. 6 are as follows:

1. UE and 5G system execute primary authentication and establish the key hierarchy, which includes the key $K_{AUSF}$ 2. After primary authentication (preferably: directly after primary authentication) 5G system (typically AUSF of the 5G system) executes AKMA Key Derivation and uses $K_{AUSF}$ to calculate $K_{AKMA}$, and A-KID, same as in the conventional AKMA mechanism.

A-KID is an identifier in format username@realm. Username includes RID (routing indicator) and A-TID (AKMA temporary ID), realm includes the HN identifier HNI. By A-TID, the UE and its AKMA key are identified within the HN.

A-TID is calculated using a cryptographic one-way function (called KDF) with the UE's SUPI and $K_{AUSF}$ as input parameters as summarized in FIG. 2. The results and the corresponding SUPI are stored in a database using A-KID as a key identifier. Depending on the implementation, also A-TID might be used as a key identifier instead of A-KID.

At that point in time, the 5G system does not know yet, which AF will make authorization requests later on. Therefore, A-TID-PRIV is typically not calculated at that point in time. Since A-TID-PRIV has been designed by intention as a combination (e.g. concatenation) of a part which does not depend on AF_ID and a part depending on AF_ID, it is not necessary at that time. Nevertheless, as an option, the 5G system may calculate A-TID-PRIV in advance for all possible values of AF_ID or for a subset thereof and store A-TID-PRIV together with $K_{AKMA}$ and SUPI using A-TID-PRIV as key identifier. Pre-calculation of A-TID-PRIV is recommendable, if the A-TID-PRIV is calculated as the result of a cryptographic one-way function using a combination of SUPI and AF_ID as input because for the one AF-ID, there may be plural A-TID-PRIV for different UEs.

3. The UE initiates the AKMA procedure and uses $K_{AUSF}$ to calculate $K_{AKMA}$ and A-TID using the same algorithms as the 5G system. Other than in conventional 3GPP TS 33.535, the UE may not calculate $K_{AF}$ using $K_{AKMA}$ and AF_ID as input. Rather, the UE calculates A-TAI and combines A-TID and A-TAI to obtain A-TID-PRIV according to a predefined rule. Depending on implementation, it may construct A-KID-PRIV based on A-TID-PRIV. A-KID-PRIV may be derived from A-TID-PRIV, and A-TID-PRIV may be derived from A-KID-PRIV. For example, this derivation of A-KID-PRIV from A-TID-PRIV may use the same algorithm (based on RID and HNI) as conventionally used for constructing A-KID from A-TID. Thus, if RID and HNI are known, A-TID-PRIV may be derived from A-KID-PRIV.

The AF_ID may be a concatenation of the FQDN of the AF and of a Ua* security protocol identifier.

As an option A-TID-PRIV might not be calculated as a combination of A-TID and A-TAI, but as a direct result of a calculation using a cryptographic one-way function using SUPI and AF_ID or any suitable combination of both as input.

4. The UE sends a Session Establishment Request to the AF, which contains the A-KID-PRIV. Since the A-KID-PRIV does not contain the identity of the UE in plain text, the privacy of the UE is protected.

The request may also contain an indicator indicating that A-KID-PRIV is used as key identifier, for instance "3GPP-AKMA-PRIV". Using a new value for the key indicator allows deployments with a coexistence of UEs using the new privacy protected key identifier A-KID-PRIV with UEs using A-KID.

5. The AF sends a AKMA AFKey Request via the Network Exposure Function (if the AF is external to the network and non-trusted) to AAnF (directly to AAnF if the AF is trusted or belongs to the 5G system) of the 5G system. The request contains the A-KID-PRIV and the AF_ID. AAnF may be a part of AUSF.

The AF may use the indicator included in action 4 to decide whether the provided key identifier is interpreted as A-KID-PRIV.

Likewise, the AKMA AFKey Request may include an indication, whether the provided key identifier is of type A-KID-PRIV.

6. If the AF is external to the network and non-trusted, the NEF authorizes the request, i.e., the 5G system checks that the AF is allowed to make requests for the provided AF_ID. Authorizing the request is not necessary if the AF is internal to the network or trusted.

7. The 5G system (AAnF) knowing RID and HNI) extracts A-TID and A-TAI from the A-KID-PRIV (depending on implementation via A-TID-PRIV). Extraction of A-TID and A-TAI is possible because these parameters are combined into A-TID-PRIV according to a predetermined rule. In particular, both parameters may have a fixed well-known length, and their sequence in a concatenation may be defined by the predetermined rule. As another option, a predefined separator may separate the parameters included in A-TID-PRIV.

The 5G system constructs a new A-KID using A-TID as an input. All other parts (e.g. RID and HNI) used to construct the new A-KID are the same as in the received A-KID. The 5G system uses A-KID (or A-TID, depending on implementation; in such an implementation, construction of A-KID may be omitted) as a search key and fetches the $K_{AKMA}$ computed by the 5G system in action 2 and the SUPI from the database. The 5G system calculates $K_{AF}$ using $K_{AKMA}$ and AF_ID as input.

The 5G system compares the calculated A-TAI with the A-TAI, which has been extracted from the received A-KID-PRIV. Only if the calculated A-TAI is identical to the received A-TAI (extracted from A-KID-PRIV), AF will be authorized for the session with the UE and receives $K_{AF}$ and GPSI of the UE. Otherwise, the authorization request is refused, $K_{AF}$ and GPSI of the UE are not provided to AF, and 5GS may send an error message to AF (not shown in FIG. 6).

If A-TID-PRIV has been calculated in action 2 already, the 5G system might use the A-TID-PRIV extracted from the received A-KID-PRIV to retrieve SUPI and $K_{AKMA}$ from the database. In this case the extracting of A-TID and A-TAI and comparison of calculated and extracted A-TAI is not needed.

In case an indication is used to indicate whether the key identifier is of type A-KID-PRIV, the actions related to A-KID-PRIV are executed only if the indicator indicates a key identifier of type A-KID-PRIV. Otherwise the received key identifier is interpreted as A-KID and handled as defined by prior art (3GPP TS 33.535).

8. If the 5G system authorizes the AF for the session with the UE in action 7, the 5G system returns the $K_{AF}$ together with the GPSI to the AF.

The 5G system returns the Generic Public Subscriber Identifier because the SUPI is intended for usage only within the 5G system, and in FIG. 6, an external AF is assumed (an internal AF would get the SUPI).

9. At this point in time, the AF knows the identity of the UE, and the UE and AF have a shared secret, i.e., $K_{AF}$. Thus, AF and UE can continue with the Session Establishment.

In a variant according to some example embodiments of the invention, for the calculation of A-TAI, the concatenation of SUPI and AF_ID can be used as input parameter P1, and the length of this concatenation can be used as Input parameter L1. In a further variant according to some example embodiments of the invention, for the calculation of A-TAI, $K_{AF}$ can be used instead of $K_{AKMA}$.

Figures 7, 8:
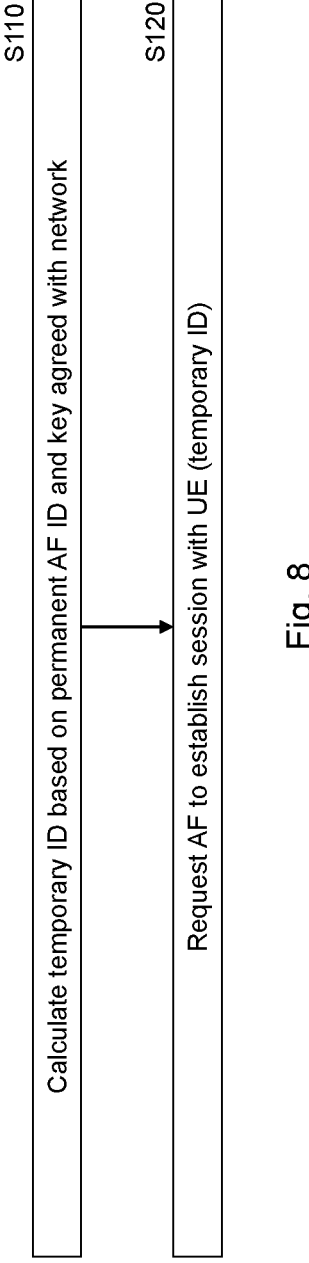
FIG. 7 shows an apparatus according to an example embodiment of the invention.
FIG. 8 shows a method according to an example embodiment of the invention.

FIG. 7 shows an apparatus according to an example embodiment of the invention. The apparatus may be a terminal (such as a UE) or an element thereof. FIG. 8 shows a method according to an example embodiment of the invention. The apparatus according to FIG. 7 may perform the method of FIG. 8 but is not limited to this method. The method of FIG. 8 may be performed by the apparatus of FIG. 7 but is not limited to being performed by this apparatus.

The apparatus comprises means for calculating 110 and means for requesting 120. The means for calculating 110 and means for requesting 120 may be a calculating means and requesting means, respectively. The means for calculating 110 and means for requesting 120 may be a calculator and requester, respectively. The means for calculating 110 and means for requesting 120 may be a calculating processor and requesting processor, respectively.

The means for calculating 110 calculates a temporary identifier for an establishment request (such as A-TAI) based on a permanent identifier of an application function and a first key agreed between a terminal and a network (such as $K_{AUSF}$ on which $K_{AKMA}$ is based) used to authenticate the terminal by a network (S110). The means for requesting 120 requests the application function to establish a session with the terminal. The requesting is performed by providing an establishment request to the application function. The establishment request comprises the temporary identifier for the establishment request calculated in S110.

FIG. 9 shows an apparatus according to an example embodiment of the invention. The apparatus may be a network (such as a 5GS) or a function (such as a AUSF and/or a AANF), or an element of such a function. FIG. 10 shows a method according to an example embodiment of the invention. The apparatus according to FIG. 9 may perform the method of FIG. 10 but is not limited to this method. The method of FIG. 10 may be performed by the apparatus of FIG. 9 but is not limited to being performed by this apparatus.

The apparatus comprises means for monitoring 210, means for forming 220, means for retrieving 230, means for calculating 240, means for checking 250, and means for inhibiting 260. The means for monitoring 210, means for forming 220, means for retrieving 230, means for calculating 240, means for checking 250, and means for inhibiting 260 may be a monitoring means, forming means, retrieving means, calculating means, checking means, and inhibiting means, respectively. The means for monitoring 210, means for forming 220, means for retrieving 230, means for calculating 240, means for checking 250, and means for inhibiting 260 may be a monitor, former, retriever, calculator, checker, and inhibiter, respectively. The means for monitoring 210, means for forming 220, means for retrieving 230, means for calculating 240, means for checking 250, and means for inhibiting 260 may be a monitoring processor, forming processor, retrieving processor, calculating processor, checking processor, and inhibiting processor.

The means for monitoring 210 monitors whether a network receives an authorization request for establishing a session of an application function with a terminal (S210). The authorization request comprises a permanent identifier of the application function, a received temporary identifier of the application function (such as A-TAI), and a temporary identifier of a terminal (such as A-TID).

If the authorization request is received (S210=yes), the means for forming 220, means for retrieving 230, means for calculating 240, and means for checking 250, and means for inhibiting 260 may perform the following actions:

The means for forming 220 forms a key identifier (such as A-KID) based on the temporary identifier of the terminal (S220). The means for retrieving 230 retrieves, from a data repository, a stored key (such as $K_{AKMA}$) and a first permanent identifier of the terminal (such as SUPI) (S230). In the data repository, the stored key and the first permanent identifier of the terminal are associated to the key identifier, i.e. the key identifier is used as a search key.

The means for calculating 240 calculates a calculated temporary identifier of the application function (such as A-TAI) based on the permanent identifier of the application function and the stored key (S240).

The means for checking 250 checks whether the calculated temporary identifier of the application function is identical with the received temporary identifier of the application function (S250). If the calculated temporary identifier of the application function is not identical with the received temporary identifier of the application function (S250=no), the means for inhibiting 260 inhibits authorizing the application function for the establishing the session with the terminal (S260). If the calculated temporary identifier of the application function is identical with the received temporary identifier of the application function (S250=yes), a means for authorizing may authorize the application function for the establishing the session with the terminal by an authorization message to the application function (not shown in FIGS. 9 and 10). The authorization message comprises a second permanent identifier of the terminal (such as GPSI or SUPI) and a key (such as $K_{AF}$) for the establishing the session. The second permanent identifier of the terminal is based on the first permanent identifier of the terminal. In particular, the second permanent identifier of the terminal may be identical with the first permanent identifier of the terminal (such as SUPI) in case the AF is internal to the network.

FIG. 11 shows an apparatus according to an example embodiment of the invention. The apparatus may be a network (such as a 5GS) or a function (such as a AUSF and/or a AANF), or an element of such a function. FIG. 12 shows a method according to an example embodiment of the invention. The apparatus according to FIG. 11 may perform the method of FIG. 12 but is not limited to this method. The method of FIG. 12 may be performed by the apparatus of FIG. 11 but is not limited to being performed by this apparatus.

The apparatus comprises means for calculating 310, means for storing 320, means for monitoring 330, means for checking 340, and means for inhibiting 350. The means for calculating 310, means for storing 320, means for monitoring 330, means for checking 340, and means for inhibiting 350 may be a calculating means, storing means, monitoring means, checking means, and inhibiting means, respectively. The means for calculating 310, means for storing 320, means for monitoring 330, means for checking 340, and means for inhibiting 350 may be a calculator, storing device, monitor, checker, and inhibiter, respectively. means for calculating 310, means for storing 320, means for monitoring 330, means for checking 340, and means for inhibiting 350 may be a calculating processor, storing processor, monitoring processor, checking processor, and inhibiting processor.

The means for calculating 310 calculates, for each of one or more application functions and for each of one or more terminals, a respective pre-calculated temporary identifier for an establishment request (e.g. A-TID-PRIV) for establishing a session between the respective terminal and the respective application function (S310). The calculation is performed by inputting a first permanent identifier of the respective terminal (e.g. SUPI or GPSI), a permanent identifier of the respective application function (e.g. AF ID), and a first key agreed between the respective terminal and a network into a cryptographic one-way function (such as $K_{AUSF}$ or $K_{AKMA}$) to obtain the respective pre-calculated temporary identifier for the establishment request for the establishing the session between the respective terminal and the respective application function as an output from the cryptographic one-way function. Such a calculation may be performed for one or more terminals such that for each application function, one or more pre-calculated temporary identifiers for a respective establishment request may be calculated.

The means for storing 320 stores, for the permanent identifier of each of the one or more application functions, in a data repository, the pre-calculated temporary identifier for the establishment request for the establishing the session between the respective terminal and the respective application function along with a second permanent identifier of the respective terminal (e.g. SUPI or GPSI) (S320). The second permanent identifier of the respective terminal may be the same as the first permanent identifier of the respective terminal or different therefrom.

The means for monitoring 330 monitors whether the network (e.g. AAnF) receives an authorization request for authorizing one of the one or more application functions for establishing the session with the one of the one or more application functions, wherein the authorization request comprises a received temporary identifier for the establishment request (e.g. A-TID-PRIV) and the permanent identifier of the one of the one or more application functions (e.g. AF ID) (S330).

If the network receives the authorization request (S330=yes), the means for checking 340 and means for inhibiting 350 may perform the following actions:

The means for checking 340 checks whether, for the permanent identifier of the one of the one or more application functions, one of the one or more stored pre-calculated temporary identifiers for the establishment request is identical with the received temporary identifier for the establishment request (S340).

If, for the permanent identifier of the one of the one or more application functions, each of the one or more stored pre-calculated temporary identifiers for the establishment request is not identical with the received temporary identifier for the establishment request (S340=no), the means for inhibiting 350 inhibits the authorizing the application function for the establishing the session with the one of the one or more application functions (S350).

FIG. 13 shows an apparatus according to an example embodiment of the invention. The apparatus may be an application function (such as an AF) or an element thereof. FIG. 14 shows a method according to an example embodiment of the invention. The apparatus according to FIG. 13 may perform the method of FIG. 14 but is not limited to this method. The method of FIG. 14 may be performed by the apparatus of FIG. 13 but is not limited to being performed by this apparatus.

The apparatus comprises means for monitoring 410 and means for requesting 420. The means for monitoring 410 and means for requesting 420 may be a monitoring means and requesting means, respectively. The means for monitoring 410 and means for requesting 420 may be a monitor and requester, respectively. The means for monitoring 410 and means for requesting 420 may be a monitoring processor and requesting processor, respectively.

The means for monitoring 410 monitors whether an application function receives an establishment request (S410). The establishment request requests to establish a session between the application function and a terminal. The establishment request comprises a temporary identifier of the application function (such as A-TAI) and a temporary identifier of the terminal (such as A-TID).

If the application function receives the establishment request (S410=yes), the means for requesting 420 requests, from a network, an authorization for the establishing the session between the application function and the terminal (S420). The request is made by providing an authorization request to the network. The authorization request comprises a permanent identifier of the application function, the temporary identifier of the application function, and the temporary identifier of the terminal.

FIG. 15 shows an apparatus according to an example embodiment of the invention. The apparatus comprises at least one processor 810, at least one memory 820 storing instructions that, when executed by the at least one processor 810, cause the apparatus at least to perform the method according to at least one of the following figures and related description: FIG. 8 or FIG. 10 or FIG. 12 or FIG. 14.

Some example embodiments are described where the same cryptographic one-way function is used to derive A-TAI and A-TID. However, in some example embodiments, different cryptographic one-way functions may be used to derive A-TAI and A-TID. however, a same (first) cryptographic one-way function should be used to derive A-TAI in UE and in the network (AUSF), and a same (second) cryptographic one-way function should be used to derive A-TID in UE and in the network (AUSF).

According to some example embodiments, UE provides to AF, in the session establishment request, A-TID-PRIV, which is a concatenation of A-TID (or A-KID) and A-TAI. In the concatenation, A-TID (or A-KID) may be in front of A-TAI, or A-TAI may be in front of A-TID (or A-KID). Some example embodiments do not use concatenation to combine A-TAI and A-TID (or A-KID): For example, in some example embodiments, portions of A-TAI and A-TID (or A-KID) are interleaved according to a predetermined order. In some example embodiments, UE may provide A-TAI and A-TID (or A-KID) in different messages. For example, the session establishment request may comprise only one of A-TAI but not A-TID (or A-KID). Upon receipt of such a session establishment request, AF may inquire UE for A-TID (or A-KID) before AF requests authorization from the network using both A-TAI and A-TID (or A-KID).

Some example embodiments of the invention are explained using an authentication key (such as $K_{AUSF}$ or $K_{AKMA}$) as the first key agreed between the UE and the network. However, the invention is not limited to authentication keys. Any key agreed between the UE and the network may be used as the first key.

Some example embodiments are explained with respect to a 5G system. However, the invention is not limited to 5G systems. It may be used in other communication networks such as 4G, 6G, 7G networks, too if they provide a functionality corresponding to AKMA. I.e., it may be used even in non-3GPP mobile communication networks.

A UE is an example of a terminal. It may be a mobile phone, a smartphone, a laptop, an IoT device, a MTC device, etc. suitable to communicate with the respective network.

One piece of information may be transmitted in one or plural messages from one entity to another entity. Each of these messages may comprise further (different) pieces of information.

Names of network elements, network functions, protocols and methods are based on current standards. In other versions or other technologies, the names of these network elements and/or network functions and/or protocols and/or methods may be different, as long as they provide a corresponding functionality. The same applies correspondingly to the terminal.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be deployed in the cloud.

According to the above description, it should thus be apparent that example embodiments of the present invention provide, for example, a terminal (such as a UE, a MTC device, etc.) or a component thereof, an apparatus embodying the same, a method for controlling and/or operating the same and computer program(s) controlling and/or operating the same as well as mediums carrying such computer program(s) and forming computer program product(s). According to the above description, it should thus be apparent that example embodiments of the present invention provide, for example, a network, in particular an authorization function (such as a AUSF) and/or an anchor function (such as AAnF) or a component of such a function, an apparatus embodying the same, a method for controlling and/or operating the same and computer program(s) controlling and/or operating the same as well as mediums carrying such computer program(s) and forming computer program product(s). According to the above description, it should thus be apparent that example embodiments of the present invention provide, for example, an application function, (such as an AF) or a component thereof, an apparatus embodying the same, a method for controlling and/or operating the same and computer program(s) controlling and/or operating the same as well as mediums carrying such computer program(s) and forming computer program product(s). The mediums carrying computer program(s) may be transitory mediums or non-transitory mediums. The term "non-transitory," as used herein, is a limitation of the medium itself (i.e., tangible, not a signal) as opposed to a limitation on data storage persistency (e.g., RAM vs. ROM).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred example embodiments of the present invention. However, it should be noted that the description of the preferred example embodiments is given by way of example only and that various modifications may be made without departing from the scope of the invention as defined by the appended claims.

The terms "first X" and "second X" include the options that "first X" is the same as "second X" and that "first X" is different from "second X", unless otherwise specified. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

The invention claimed is:

1. Apparatus comprising:

one or more processors and memory storing instructions that, when executed by the one or more processors, cause the apparatus to perform:

calculating a temporary identifier for an establishment request based on a permanent identifier of an application function and a first key agreed between a terminal and a network by:

calculating a temporary identifier of the application function using a first cryptographic one-way function with the permanent identifier of the application function and the first key or a derived key as input parameters, wherein the derived key is derived from the first key, and combining the temporary identifier of the application function with a temporary identifier of the terminal to obtain the temporary identifier for the establishment request by interleaving portions of the temporary identifier of the application function and portions of the temporary identifier of the terminal to obtain the temporary identifier for the establishment request; and requesting the application function, by an establishment request, to establish a session with the terminal, wherein the establishment request comprises the temporary identifier for the establishment request.

2. The apparatus according to claim 1, wherein the instructions, when executed by the one or more processors, further cause the apparatus to perform calculating the temporary identifier of the terminal by a second cryptographic one-way function with a permanent identifier of the terminal and one of the first key and the derived key, as input parameters.

3. The apparatus according to claim 2, wherein the first cryptographic one-way function is the same as the second cryptographic one-way function.

4. The apparatus according to claim 2, wherein the instructions, when executed by the one or more processors, cause the apparatus to perform the combining by one of concatenating the temporary identifier of the application function and the temporary identifier of the terminal to obtain the temporary identifier for the establishment request; and interleaving portions of the temporary identifier of the application function and portions of the temporary identifier of the terminal to obtain the temporary identifier for the establishment request.

5. The apparatus according to claim 3, wherein the instructions, when executed by the one or more processors, cause the apparatus to perform the combining by one of concatenating the temporary identifier of the application function and the temporary identifier of the terminal to obtain the temporary identifier for the establishment request; and interleaving portions of the temporary identifier of the application function and portions of the temporary identifier of the terminal to obtain the temporary identifier for the establishment request.

6. The apparatus according to claim 1, wherein the instructions, when executed by the one or more processors, cause the apparatus to perform the calculating the temporary identifier for the establishment request by inputting the permanent identifier of the application function, the first key or a derived key, and a permanent identifier of the terminal into a third cryptographic one-way function to obtain the temporary identifier for the establishment request as an output from the third cryptographic one-way function, wherein the derived key is derived from the first key.

7. Apparatus comprising:

one or more processors and memory storing instructions that, when executed by the one or more processors, cause the apparatus to perform:

monitoring whether a network receives an authorization request for establishing a session of an application function with a terminal, wherein the authorization request comprises a permanent identifier of the application function, a received temporary identifier of the application function, and a temporary identifier of a terminal;

if the authorization request is received:

forming a key identifier based on the temporary identifier of the terminal;

retrieving, from a data repository, based on the key identifier, a stored key and a first permanent identifier of the terminal;

calculating a calculated temporary identifier of the application function based on the permanent identifier of the application function and the stored key;

checking whether the calculated temporary identifier of the application function is identical with the received temporary identifier of the application function;

inhibiting authorizing the application function for the establishing the session with the terminal if the calculated temporary identifier of the application function is not identical with the received temporary identifier of the application function.

8. The apparatus according to claim 7, wherein the instructions, when executed by the one or more processors, cause the apparatus to perform the forming the key identifier based on the temporary identifier of the terminal and a first key agreed between the terminal by the network.

9. The apparatus according to claim 7, wherein the instructions, when executed by the one or more processors, further cause the apparatus to perform authorizing the application function for the establishing the session with the terminal by an authorization message to the application function if the calculated temporary identifier of the application function is identical with the received temporary identifier of the application function, wherein the authorization message comprises a second permanent identifier of the terminal and a key for the establishing the session.

10. The apparatus according to claim 8, wherein the instructions, when executed by the one or more processors, further cause the apparatus to perform authorizing the application function for the establishing the session with the terminal by an authorization message to the application function if the calculated temporary identifier of the application function is identical with the received temporary identifier of the application function, wherein the authorization message comprises a second permanent identifier of the terminal and a key for the establishing the session.

11. The apparatus according to claim 5, wherein the instructions, when executed by the one or more processors, further cause the apparatus to perform retrieving the second permanent identifier of the terminal from the data repository based on the first permanent identifier of the terminal.

12. The apparatus according to claim 10, wherein the instructions, when executed by the one or more processors, further cause the apparatus to perform calculating the key for the establishing the session based on the permanent identifier of the application function and the first key.

13. Apparatus comprising:

one or more processors and memory storing instructions that, when executed by the one or more processors, cause the apparatus to perform:

calculating, for each of one or more application functions and for each of one or more terminals, a pre-calculated temporary identifier for an establishment request for establishing a session between the respective terminal and the respective application function by inputting a first permanent identifier of the respective terminal, a permanent identifier of the respective application function, and a first key agreed between the respective terminal and a network into a cryptographic one-way function to obtain the pre-calculated temporary identifier for the establishment request for the establishing the session between the respective terminal and the respective application function as an output from the cryptographic one-way function;

storing, for the permanent identifier of each of the one or more application functions, in a data repository, the pre-calculated temporary identifier for the establishment request for the establishing the session between the respective terminal and the respective application function along with a second permanent identifier of the respective terminal;

monitoring whether the network receives an authorization request for authorizing one of the one or more application functions for establishing the session with the one of the one or more application functions, wherein the authorization request comprises a received temporary identifier for the establishment request and the permanent identifier of the one of the one or more application functions;

if the network receives the authorization request:

checking whether, for the permanent identifier of the one of the one or more application functions, one of the one or more stored pre-calculated temporary identifiers for the establishment request is identical with the received temporary identifier for the establishment request;

inhibiting the authorizing the application function for the establishing the session with the one of the one or more application functions if, for the permanent identifier of the one of the one or more application functions, each of the one or more stored pre-calculated temporary identifiers for the establishment request is not identical with the received temporary identifier for the establishment request.

14. The apparatus according to claim 13 wherein the instructions, when executed by the one or more processors, further cause the apparatus to perform, if, for the permanent identifier of the one of the one or more application functions, one of the one or more pre-calculated temporary identifiers for the establishment request is identical with the received temporary identifier for the establishment request:

retrieving the second permanent identifier of a first terminal of the one or more terminals stored along with the respective pre-calculated temporary identifier for the establishment request being identical with the received temporary identifier for the establishment request;

authorizing the one of the one or more application functions for the establishing the session between the first terminal and the one of the one or more application functions by an authorization message to the one of the one or more application functions, wherein the authorization message comprises a third permanent identifier of the first terminal and a key for the establishing the session between the first terminal and the respective application function.

15. The apparatus according to claim 13, wherein the instructions, when executed by the one or more processors, further cause the apparatus to perform calculating the key for the establishing the session between the first terminal and the respective application function based on the permanent identifier of the respective application function and the first key of the first terminal.

16. The apparatus according to claim 15, wherein the instructions, when executed by the one or more processors, further cause the apparatus to perform storing the key for the establishing the session between the first terminal and the respective application function along with the pre-calculated temporary identifier for the establishment request between the first terminal and the respective application function in the data repository;

retrieving the key for the establishing the session stored for the one of the one or more application functions along with the one of the pre-calculated temporary identifiers for the establishment request if, for the one of the one or more application functions, the one of the pre-calculated temporary identifiers for the establishment request stored along with the second permanent identifier of the first terminal is identical with the received temporary identifier for the establishment request.

* * * * *